US012595908B1

(12) United States Patent
DiCintio et al.

(10) Patent No.: US 12,595,908 B1
(45) Date of Patent: Apr. 7, 2026

(54) COMBUSTOR WITH ADDITIVELY MANUFACTURED COMBUSTOR BODY HAVING AFT FRAME WITH HEAT TRANSFER AUGMENTATION

(71) Applicant: GE Infrastructure Technology LLC, Greenville, SC (US)

(72) Inventors: Richard Martin DiCintio, Simpsonville, SC (US); Ronnie Pentecost, Travelers Rest, SC (US); Christopher Michael West, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/020,211

(22) Filed: Jan. 14, 2025

(51) Int. Cl.
F23R 3/00          (2006.01)
B33Y 80/00         (2015.01)
F01D 9/02          (2006.01)

(52) U.S. Cl.
CPC .............. *F23R 3/002* (2013.01); *F01D 9/023* (2013.01); *B33Y 80/00* (2014.12); *F23R 2900/00018* (2013.01); *F23R 2900/03044* (2013.01); *F23R 2900/03045* (2013.01)

(58) Field of Classification Search
CPC .. F23R 3/002; F23R 3/60; F23R 2900/00018; F23R 2900/03043; F23R 2900/03044; F01D 9/023
See application file for complete search history.

(56) References Cited

U.S. PATENT DOCUMENTS

| | | | | |
|---|---|---|---|---|
| 4,872,312 | A * | 10/1989 | Iizuka | F01D 9/023 60/754 |
| 8,001,787 | B2 * | 8/2011 | Sutcu | F01D 25/12 60/752 |
| 8,549,861 | B2 * | 10/2013 | Huffman | F01D 25/12 60/752 |
| 8,707,705 | B2 * | 4/2014 | Berry | F01D 9/023 60/39.83 |
| 9,010,127 | B2 * | 4/2015 | Willis | F01D 9/023 60/806 |
| 9,574,498 | B2 * | 2/2017 | Fadde | F23R 3/60 |
| 10,577,957 | B2 * | 3/2020 | Davis, III | F01D 9/023 |
| 10,787,918 | B2 * | 9/2020 | Marlow | F23R 3/42 |

(Continued)

*Primary Examiner* — Alain Chau
(74) *Attorney, Agent, or Firm* — Charlotte Wilson; James Pemrick; Hoffman Warnick LLC

(57)          ABSTRACT

A combustor for a gas turbine system includes an additively manufactured (AM) combustor body including a one-piece member. The member includes a combustion liner including a transition portion, and an aft frame at an aft end of the transition portion. The aft frame includes an inner end integral with the combustion liner, an outer end configured to couple to a turbine inlet casing, and a circumferentially extending passage defined partially within the inner end. A plurality of circumferentially spaced ribs extends forward from the inner end of the aft frame on an exterior surface of the transition portion. A flow sleeve is integral with the circumferentially spaced ribs. The AM combustor body includes a plurality of parallel, sintered metal layers. The circumferentially extending passage, the spaced ribs and the flow sleeve promote increased convection and conduction cooling to the aft frame without loss of structural strength.

16 Claims, 10 Drawing Sheets

(56) References Cited

U.S. PATENT DOCUMENTS

| | | | |
|---|---|---|---|
| 10,830,142 B2 * | 11/2020 | DiCintio | F23R 3/002 |
| 10,837,299 B2 * | 11/2020 | Bidkar | F01D 11/005 |
| 11,215,072 B2 | 1/2022 | Davis, III et al. | |
| 2010/0170259 A1 * | 7/2010 | Huffman | F01D 25/12 |
| | | | 415/207 |
| 2011/0048030 A1 * | 3/2011 | Berry | F23R 3/002 |
| | | | 60/806 |
| 2011/0162378 A1 * | 7/2011 | Chila | F01D 9/023 |
| | | | 60/752 |
| 2013/0227964 A1 * | 9/2013 | Willis | F01D 9/023 |
| | | | 415/177 |
| 2015/0082795 A1 * | 3/2015 | Fadde | F23R 3/002 |
| | | | 60/734 |
| 2016/0097285 A1 * | 4/2016 | Harding | F23R 3/002 |
| | | | 415/115 |
| 2018/0051578 A1 * | 2/2018 | Marlow | F01D 9/023 |
| 2018/0100436 A1 * | 4/2018 | DiCintio | F01D 9/023 |
| 2018/0258782 A1 * | 9/2018 | Bidkar | F02C 3/14 |
| 2018/0258789 A1 * | 9/2018 | Bidkar | F01D 25/12 |
| 2019/0112937 A1 * | 4/2019 | Davis, III | F01D 25/08 |
| 2023/0399959 A1 | 12/2023 | Cox et al. | |

* cited by examiner

COMBUSTOR WITH ADDITIVELY MANUFACTURED COMBUSTOR BODY HAVING AFT FRAME WITH HEAT TRANSFER AUGMENTATION

TECHNICAL FIELD

The disclosure relates generally to turbomachine combustors and, more specifically, to an additively manufactured combustor body including an aft frame with heat transfer augmentation.

BACKGROUND

Gas turbine systems include a combustion section including a plurality of combustors in which fuel is combusted to create a flow of combustion gas that is converted to kinetic energy in a downstream turbine section (e.g., an expansion turbine). Current combustors include a large number of parts that need to be cooled in an efficient manner. For example, a combustor may include a generally cylindrical portion of a combustion liner concentrically located inside a flow sleeve. Cooling air from a compressor discharge plenum is directed into an annulus defined between a cylindrical portion of the combustion liner and the flow sleeve(s) to cool the cylindrical portion. A tapered transition portion of the combustion liner is coupled to an aft end of the generally cylindrical portion and transitions the hot gas path from the generally cylindrical portion's circular cross-section to a more arcuate, polygonal cross-section of a turbine inlet. The aforementioned flow sleeve may also direct cooling air along, or impinging on part of, the tapered transition portion. Air from the compressor discharge plenum may pass through impingement openings into an annulus between the transition portion and the flow sleeve.

Alternately, air may pass into the annulus via a gap between the downstream flow sleeve and an aft frame connected to the aft end of the transition portion. The aft frame couples the tapered transition portion to the turbine inlet. Current combustors direct cooling air at or into the aft frame where the cooling air is used for convective or impingement cooling of the aft frame. However, this cooling arrangement is not always an effective way to cool the aft frame because of, for example, its relatively large volume and its position relative to a turbine inlet.

BRIEF DESCRIPTION

All aspects, examples and features mentioned below can be combined in any technically possible way.

An aspect of the disclosure includes a combustor for a gas turbine system, the combustor comprising: an additively manufactured (AM) combustor body including a one-piece member including: a combustion liner including a transition portion; an aft frame at an aft end of the transition portion, the aft frame including an inner end integral with the combustion liner, an outer end configured to couple to a turbine inlet casing, and a circumferentially extending passage defined partially within the inner end; a plurality of circumferentially spaced ribs extending forward from the inner end of the aft frame on an exterior surface of the transition portion of the combustion liner; and a first flow sleeve integral with the plurality of circumferentially spaced ribs, wherein the AM combustor body further includes a plurality of parallel, sintered metal layers.

Another aspect of the disclosure includes any of the preceding aspects, and further comprising a plurality of cooling enhancement structures extending from an exterior surface of the transition portion.

Another aspect of the disclosure includes any of the preceding aspects, and further comprising a plurality of cooling enhancement channels defined in an exterior surface of the transition portion.

Another aspect of the disclosure includes any of the preceding aspects, and the first flow sleeve extends circumferentially around the transition portion at a location forward of the aft frame and includes an aft end axially spaced from the aft frame.

Another aspect of the disclosure includes any of the preceding aspects, and the aft frame includes an intermediate portion between the inner end and the outer end thereof, and further comprising a plurality of circumferentially spaced openings defined circumferentially between the plurality of circumferentially spaced ribs aft of the aft end of the first flow sleeve and defined axially between the intermediate portion and the aft end of the first flow sleeve, wherein the plurality of circumferentially spaced openings are in fluid communication with the circumferentially extending passage defined partially within the inner end of the aft frame.

Another aspect of the disclosure includes any of the preceding aspects, and the first flow sleeve is spaced from an exterior surface of the transition portion; and wherein the first flow sleeve, the plurality of circumferentially spaced ribs and the transition portion collectively define the plurality of cooling passages.

Another aspect of the disclosure includes any of the preceding aspects, and further comprising a second flow sleeve extending in a spaced manner around the combustion liner and coupled to a forward end of the first flow sleeve, the second flow sleeve defining an annular cooling passage in fluid communication with the plurality of cooling passages.

Another aspect of the disclosure includes any of the preceding aspects, and the first flow sleeve diverges from an exterior surface of the transition portion from an aft end thereof to a forward end thereof.

Another aspect of the disclosure includes any of the preceding aspects, and the first flow sleeve includes a plurality of openings therethrough and in fluid communication with a compressed air source.

Another aspect of the disclosure includes any of the preceding aspects, and further comprising a cooling passage defined within the inner end of the aft frame, the cooling passage having an inlet in fluid communication with the circumferentially extending passage and an outlet through a downstream end of the aft frame.

Another aspect of the disclosure includes any of the preceding aspects, and further comprising an impingement cooling structure defined within an enlarged portion of the circumferentially extending passage in the inner end of the aft frame, the impingement cooling structure having a plurality of inlets in fluid communication with the circumferentially extending passage and an outlet through a downstream end of the aft frame.

Another aspect of the disclosure includes a gas turbine (GT) system, comprising: a compressor section; a combustion section operatively coupled to the compressor section; and a turbine section operatively coupled to the combustion section, wherein the combustion section includes at least one combustor including: an additively manufactured (AM) combustor body including a one-piece member including: a combustion liner including a transition portion; an aft frame at an aft end of the transition portion, the aft frame including an inner end integral with the combustion liner, an outer end configured to couple to a turbine inlet, and a circumferentially extending passage defined within the inner end; a plurality of circumferentially spaced ribs extending forward from the inner end of the aft frame on an exterior surface of the transition portion of the combustion liner; and a first flow sleeve integral with the plurality of circumferentially spaced ribs, wherein the AM combustor body further includes a plurality of parallel, sintered metal layers.

Another aspect of the disclosure includes any of the preceding aspects, and further comprising a plurality of cooling enhancement structures extending from an exterior surface of the transition portion.

Another aspect of the disclosure includes any of the preceding aspects, and further comprising a plurality of cooling enhancement channels defined in an exterior surface of the transition portion.

Another aspect of the disclosure includes any of the preceding aspects, and the first flow sleeve extends circumferentially around the transition portion at a location forward of the aft frame, and includes an aft end axially spaced from the aft frame.

Another aspect of the disclosure includes any of the preceding aspects, and the aft frame includes an intermediate portion between the inner end and the outer end thereof, and further comprising a plurality of circumferentially spaced openings defined circumferentially between the plurality of circumferentially spaced ribs aft of the aft end of the first flow sleeve and defined axially between the intermediate portion and the aft end of the first flow sleeve, wherein the plurality of circumferentially spaced openings are in fluid communication with the circumferentially extending passage in the inner end of the aft frame.

Another aspect of the disclosure includes any of the preceding aspects, and the first flow sleeve is spaced from an exterior surface of the transition portion; and wherein the first flow sleeve, the plurality of circumferentially spaced ribs and the transition portion collectively define a plurality of cooling passages.

Another aspect of the disclosure includes any of the preceding aspects, and the first flow sleeve diverges from an exterior surface of the transition portion from an aft end thereof to a forward end thereof.

Another aspect of the disclosure includes any of the preceding aspects, and further comprising a cooling passage defined within the inner end of the aft frame, the cooling passage having an inlet in fluid communication with the circumferentially extending passage and an outlet through a downstream end of the aft frame.

Another aspect of the disclosure includes any of the preceding aspects, and further comprising an impingement cooling structure defined within an enlarged portion of the circumferentially extending passage in the inner end of the aft frame, the impingement cooling structure having a plurality of inlets in fluid communication with the circumferentially extending passage and an outlet through a downstream end of the aft frame.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
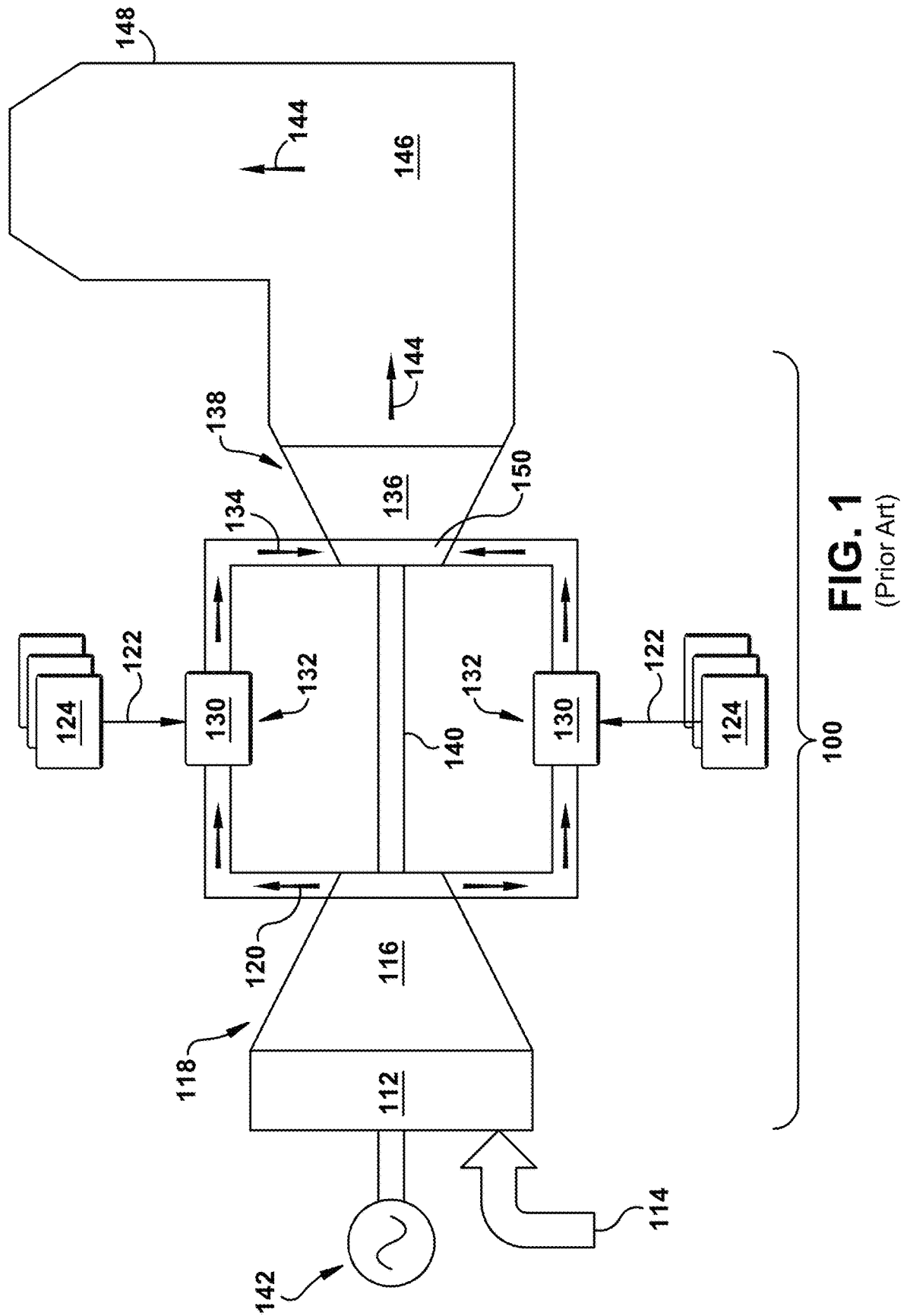
FIG. 1 shows a functional block diagram of an illustrative gas turbine system capable of use with a combustor with an additive manufactured combustor body according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within the illustrative application of a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through a combustor of the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the turbomachine.

The term "axial" refers to movement or position parallel to an axis, e.g., an axis of a combustor or turbomachine. The term "radial" refers to movement or position perpendicular to an axis, e.g., an axis of a combustor or a turbomachine. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. Finally, the term "circumferential" refers to movement or position around an axis, e.g., a central axis of a combustion liner or a circumferential interior of casing extending about a combustor. As indicated above and depending on context, it will be appreciated that such terms may be applied in relation to the axis of the combustor or the axis of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs, or the feature is present and instances where the event does not occur, or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

Embodiments of the disclosure provide a combustor for a gas turbine system. The combustor includes an additively manufactured (AM) combustor body including a one-piece member. The one-piece member includes a combustion liner including a transition portion, and an aft frame at an aft end of the transition portion. The aft frame includes an inner end integral with the combustion liner, an outer end configured to couple to a turbine inlet casing, and a circumferentially extending passage defined partially within the inner end. A plurality of circumferentially spaced ribs extends forward from the inner end of the aft frame on an exterior surface of the transition portion. A flow sleeve is integral with the circumferentially spaced ribs. The AM combustor body includes a plurality of parallel, sintered metal layers. The circumferentially extending passage, the spaced ribs, and the flow sleeve promote increased convection and conduction cooling to the aft frame without loss of structural strength. The spaced ribs also allow a sliding interface with a second flow or impingement sleeve without the need for stiffeners for that second flow or impingement sleeve.

FIG. 1 shows a functional block diagram of an illustrative gas turbine (GT) system 100 that may incorporate various embodiments of a combustor 130 of the present disclosure. As shown, GT system 100 generally includes an inlet section 112 that may include a series of filters, cooling coils, moisture separators, and/or other devices to purify and otherwise condition a working fluid 114 (e.g., air and/or recirculated exhaust gas) entering GT system 100. Working fluid 114 flows to a compressor 116 in a compressor section 118 that progressively imparts kinetic energy to working fluid 114 to produce a compressed working fluid 120 (alternately "air 120" or "compressed air 120" hereafter for simplicity) at a highly energized state. Compressed air 120 is mixed with a fuel(s) 122 from one or more fuel source(s) 124 to form a combustible mixture within at least one combustor 130 in a combustion section 132 that is operatively coupled to compressor section 118. The combustible mixture is burned to produce combustion gases 134 having a high temperature and pressure.

Combustion gases 134 flow through a turbine 136 (e.g., an expansion turbine) of a turbine section 138 operatively coupled to combustion section 132 to produce work. For example, turbine 136 may be connected to a shaft 140 so that rotation of turbine 136 drives compressor 116 to produce compressed air 120. Alternately, or in addition, shaft 140 may connect turbine 136 to a load such as a generator 142 for producing electricity. Exhaust gases 144 from turbine 136 flow through an exhaust section 146 that connects turbine 136 to an exhaust stack 148 downstream from turbine 136. Exhaust section 146 may include, for example, a filtering system for cleaning exhaust gases 144 and/or a heat recovery steam generator (not shown) for extracting additional heat from exhaust gases 144 before release to the environment. Where more than one combustor 130 is used, they may be circumferentially spaced around a turbine inlet casing 150 of turbine 136.

In one embodiment, GT system 100 may include an engine model from GE Vernova of Cambridge, MA. The present disclosure is not limited to any one particular GT system and may be implemented in connection with engines including, for example, any of the HA, F, B, LM, GT, TM and E-class engine models of GE Vernova, and engine models of other companies. Furthermore, the present disclosure is not limited to any particular turbomachine and may be applicable to, for example, steam turbines, jet engines, compressors, turbofans, etc.

Figure 2:
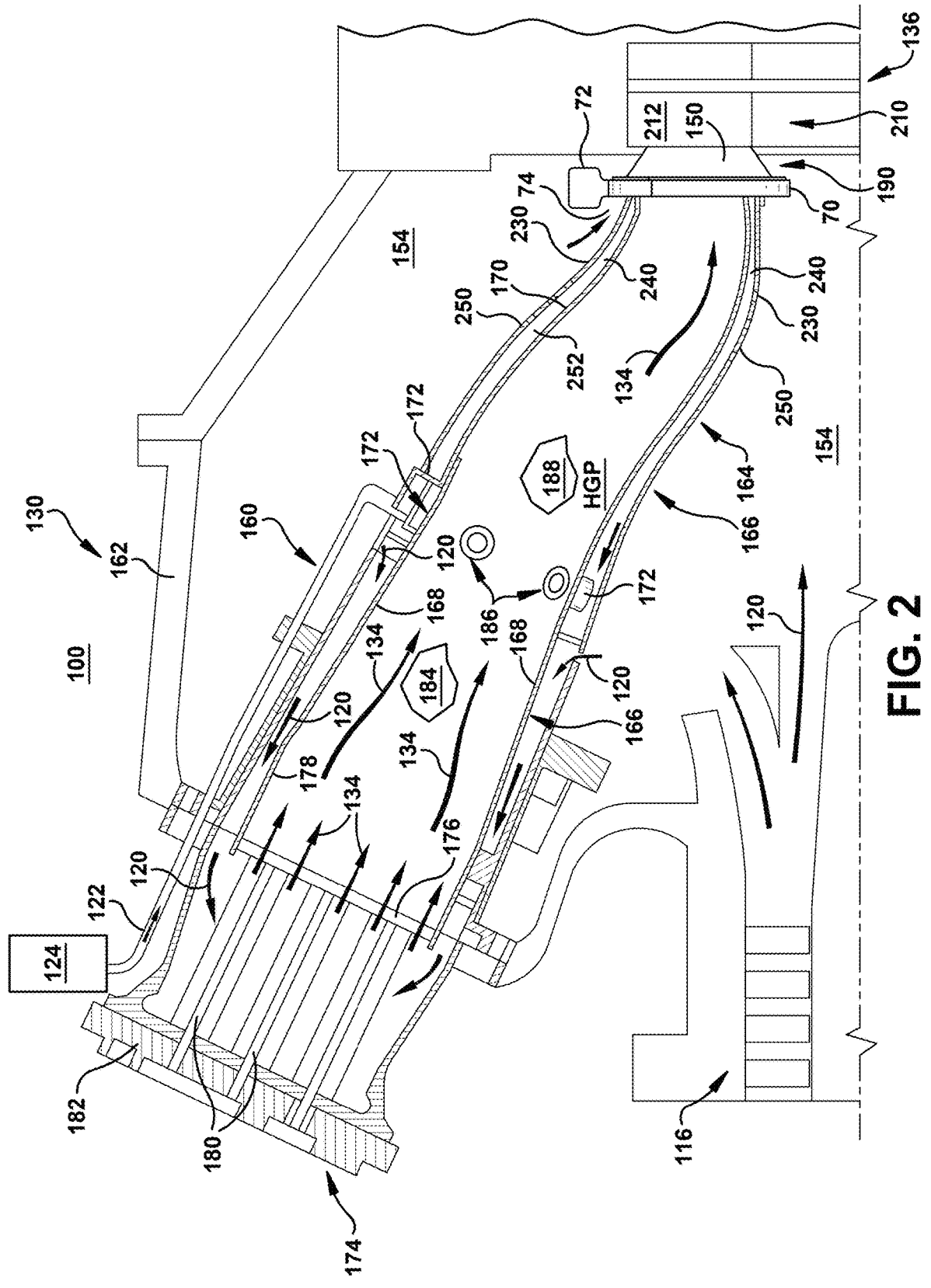
FIG. 2 shows a cross-sectional side view of a portion of a combustor with an additively manufactured combustor body according to embodiments of the disclosure.
Figure 3:
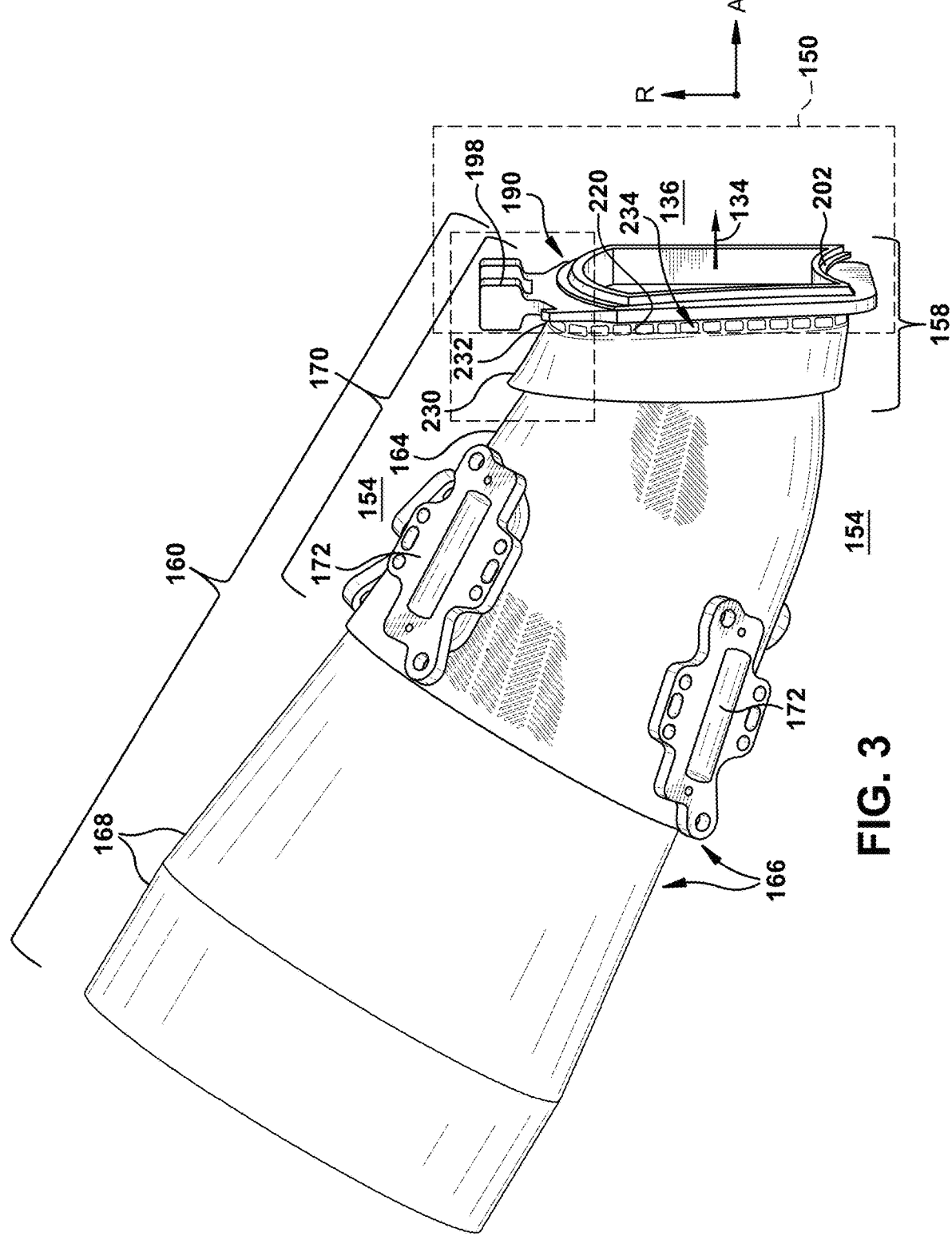
FIG. 3 shows a side perspective view of a combustor body according to embodiments of the disclosure.
Figure 4:
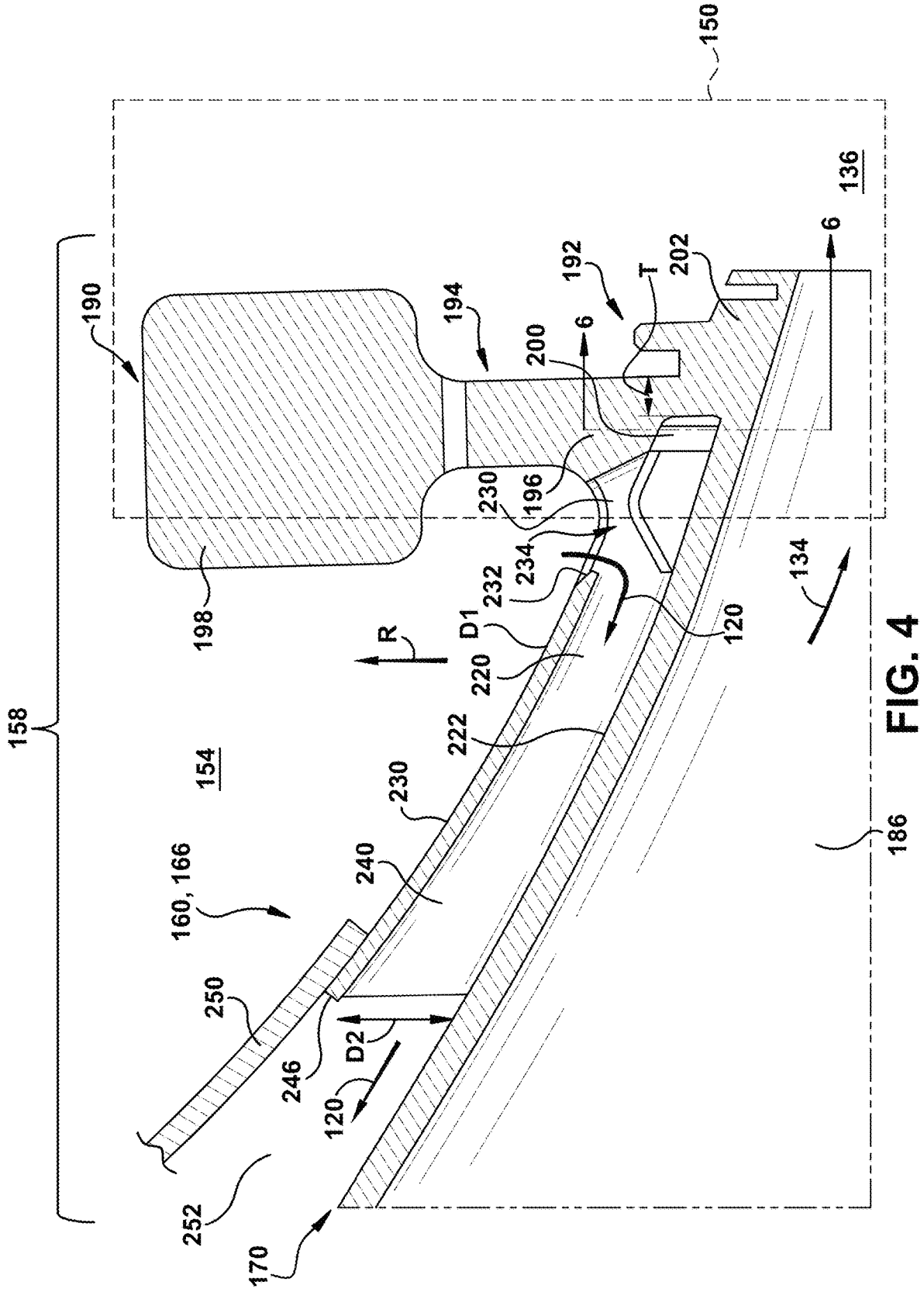
FIG. 4 shows an enlarged cross-sectional view of an aft frame region of a combustor body (per the dashed box in FIG. 3) according to embodiments of the disclosure.
Figure 5:
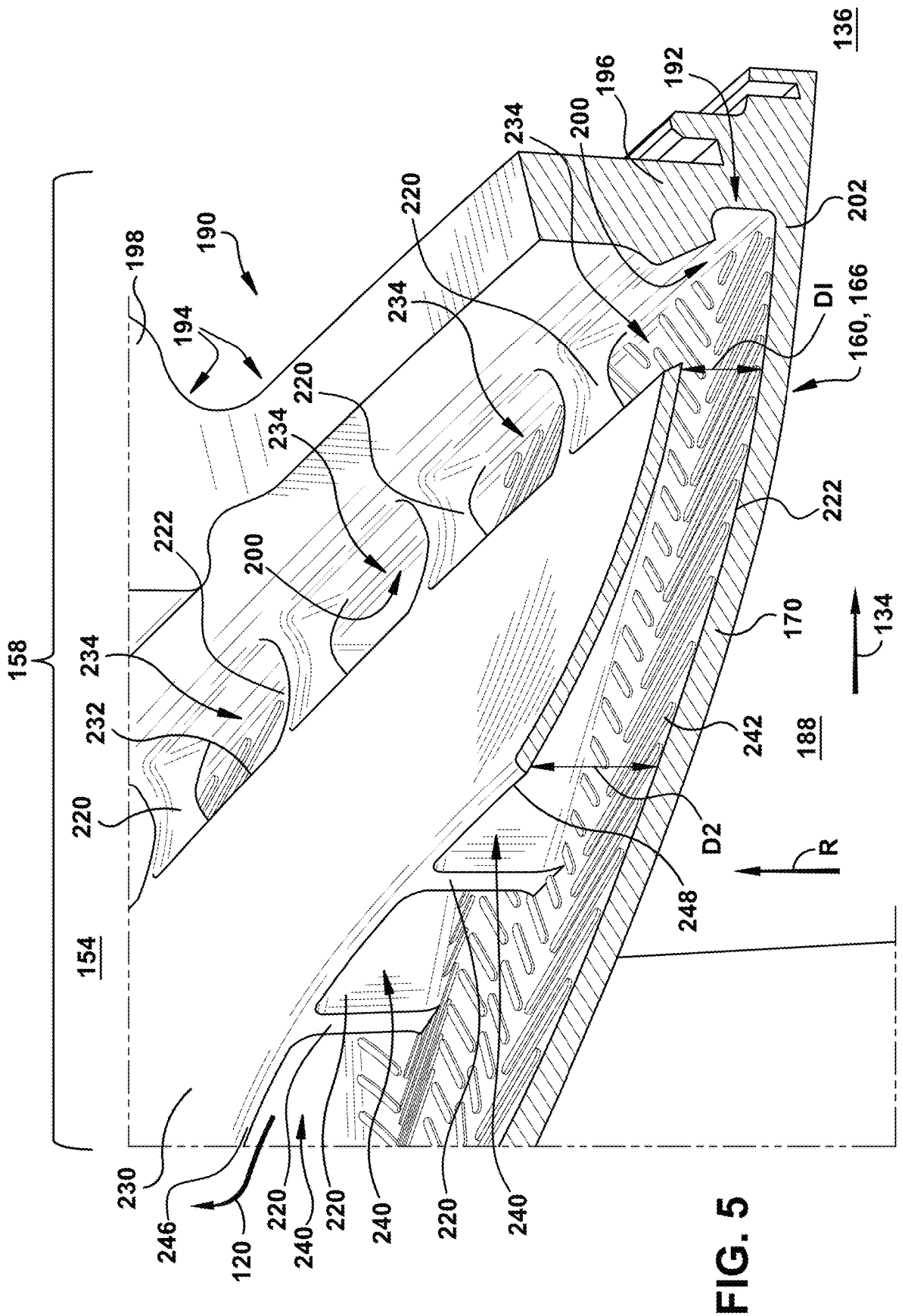
FIG. 5 shows an enlarged perspective view of an aft frame region of a combustor body according to embodiments of the disclosure.

FIG. 2 shows a cross-sectional side view of combustor 130 positioned within GT system 100; FIG. 3 shows a side perspective view of an additively manufactured (AM) combustor body 160; FIG. 4 shows an enlarged cross-sectional view of an aft frame region 158 of AM combustor body 160 (per dashed box in FIG. 3); and FIG. 5 shows an enlarged perspective view of an aft frame region of a combustor body, according to embodiments of the disclosure.

As shown in FIG. 2, combustor 130 is at least partially surrounded by an outer casing 162 such as a compressor discharge casing and/or a turbine casing. An interior of outer casing 162 is in fluid communication with compressor section 118, e.g., compressor 116, and defines a plenum that provides a compressed air source 154 used for combustion and cooling. Combustor 130 for GT system 100 includes AM combustor body 160 including a one-piece member 164. One-piece member 164 includes a combustion liner 166 including a transition portion 170, which may be tapered from a forward end thereof to an aft end thereof. Combustion liner 166 may also include a generally cylindrical (e.g., possibly frustoconical), forward portion 168 with transition portion 170 at an aft end (right side as shown in FIGS. 2, 4) of forward portion 168. That is, transition portion 170 may be integral with an aft end of forward portion 168 of combustion liner 166 where forward portion 168 is provided as part of combustion liner 166. Transition portion 170 at an aft end of forward portion 168 transitions the hot gas path (HGP) from the generally circular cross-section of forward portion 168 to a more arcuate, polygonal cross-section for coupling to turbine inlet casing 150 of turbine 136. Optionally, AM combustor body 160 may include at least one axial fuel stage (AFS) injector mount 172 directed into combustion liner 166, i.e., for mounting an AFS injector 186. As shown in FIG. 2, where two or more AFS injectors 186 are present, they are typically circumferentially spaced along at least one of forward portion 168 and/or transition portion 170, i.e., spaced around the outside of forward portion 168 and/or transition portion 170.

Combustion liner 166, also known as a hot gas path (HGP) duct or unibody liner, extends downstream from a separate head end fuel nozzle assembly 174 (hereafter "head end assembly 174") and a cap assembly 176 coupled to a forward end 178 of AM combustor body 160. That is, combustor 130 may also include a separate head end assembly 174 coupled to forward end 178 of AM combustor body 160. Head end assembly 174 generally includes at least one axially extending fuel nozzle 180 that extends downstream from an end cover 182 and cap assembly 176 that extends radially and axially within outer casing 162 downstream from end cover 182. Cap assembly 176 defines the upstream boundary of the combustion chamber. Head end assembly 174 may include any now known or later developed axially extending fuel nozzles 180 for delivering fuel(s) 122 to a primary combustion zone 184. In certain embodiments, axially extending fuel nozzle(s) 180 of head end assembly 174 extend at least partially through cap assembly 176 to provide a combustible mixture of fuel(s) and compressed air 120 to primary combustion zone 184. Where provided, AFS injectors 186 may extend radially through combustion liner 166 downstream from axially extending fuel nozzle(s) 180, i.e., at AFS injector mount(s) 172. Compressed air 120 may be routed to AFS injector(s) 186 to combine with fuel(s) 122 for combustion in a secondary combustion zone 188 that is downstream from primary combustion zone 184.

Figure 6:
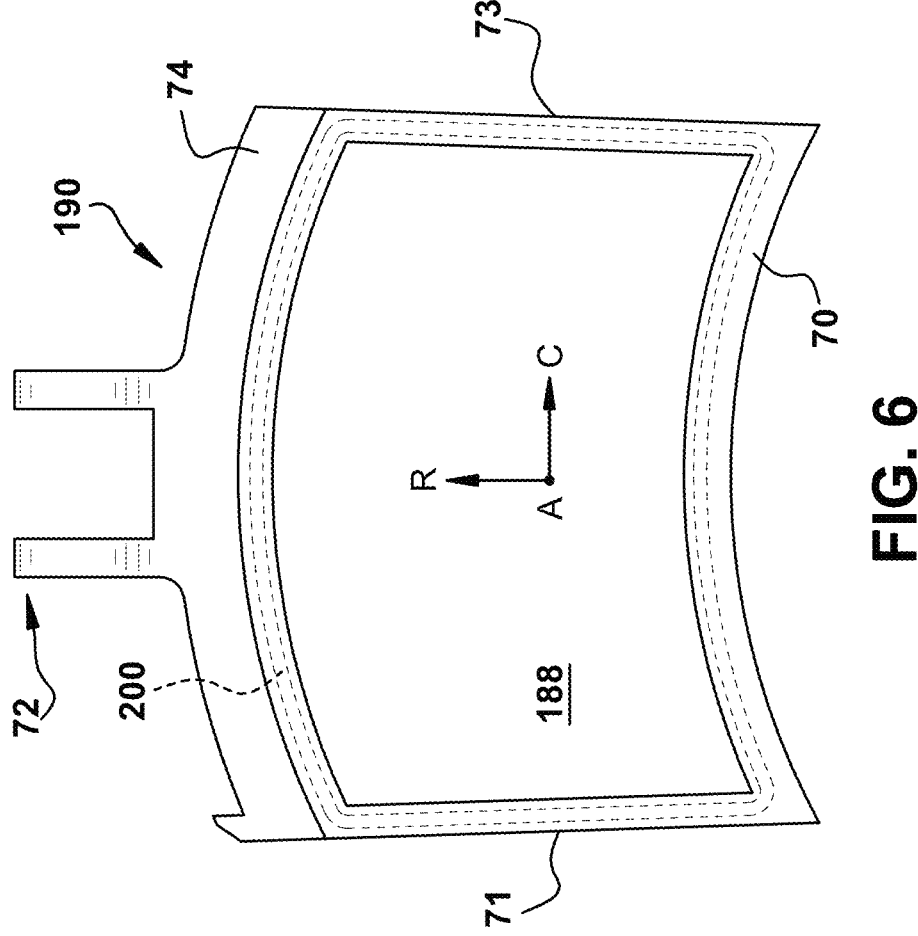
FIG. 6 shows a cross-sectional view of an aft frame of the combustor body along view line 6-6 in FIG. 4 according to embodiments of the disclosure.

Combustor 130, i.e., AM combustor body 160, also includes an aft frame 190 at an aft end (right side in FIGS. 2 and 3) of transition portion 170. As shown in FIG. 6, aft frame 190 includes arcuate bottom and top sides 70, 74, opposite sides 71, 73 (extending in a radial or generally radial direction), and a mounting structure 72. Aft frame 190 includes an inner end 192 integral with combustion liner 166, an outer end 194 configured to couple to turbine inlet casing 150, and a circumferentially extending passage 200 defined partially within inner end 192. For reference purposes, aft frame 190 also includes an intermediate portion 196 between inner end 192 and outer end 194 thereof. As shown in FIG. 3, inner end 192, outer end 194 and intermediate portion 196 are defined relative to a radial direction R from a center axis A of AM combustor body 160 at aft frame region 158 (FIG. 3). Hence, inner end 192 is radially inward of outer end 194 about AM combustor body 160. Inner end 192 also is integral with a downstream end 202 of transition portion 170 of combustion liner 166. That is, inner end 192 is generally where aft frame 190 integrates with combustion liner 166. As shown schematically in FIGS. 3 and 4, outer end 194 can have any now known or later developed connector 198 to connect aft frame 190 to turbine inlet casing 150 so, as shown in FIG. 2, combustion gases 134 are directed into a first stage 210 of stationary nozzles 212 of turbine 136. For illustration purposes, connector 198 is shown as a cube or block, but it can have a variety of alternative shapes, sizes, configurations, etc.

Circumferentially extending passage 200 is defined relative to center axis A of AM combustor body 160 at aft frame region 158 (FIGS. 3, 6). Passage 200 is described as "partially within" inner end 192 because it is open in forward direction, i.e., toward head end assembly 174. Hence, as shown in FIG. 4, inner end 192 may have a smaller axial thickness T near combustion liner 166 compared to outer end 194 and/or intermediate portion 196 of aft frame 190. In FIG. 4, circumferentially extending passage 200 (hereafter "passage 200") extends into the page.

FIG. 6 shows a cross-sectional view of aft frame 190 along view line 6-6 in FIG. 4. As shown in FIG. 6, passage 200 may follow whatever shape aft frame 190 has at aft frame region 158, around aft end of combustion liner 166. For example, it will be recognized that aft frame 190 may have a partially arcuate, rounded rectangular, cross-sectional shape at aft frame region 158 such that passage 200 has that shape. In other examples, passage 200 may not exactly follow the cross-section of aft frame 190.

Referring to FIG. 5, AM combustor body 160 also includes a plurality of circumferentially spaced ribs 220 extending forward from inner end 192 of aft frame 190 on an exterior surface 222 of transition portion 170 of combustion liner 166. Plurality of circumferentially spaced ribs 220 (hereafter "spaced ribs 220" for brevity) extend forward from inner end 192 of aft frame 190 toward head end assembly 174 (FIG. 2). Spaced ribs 220 also extend radially outward relative to center axis A of AM combustor body 160 at aft frame region 158 (FIG. 3) from exterior surface 222 of transition portion 170 of combustion liner 166. In some embodiments, the radially inward edges of spaced ribs 220 may be provided with one or more arches or other arcuate portions, so spaced ribs 220 do not disrupt or block circumferentially extending passage 200, i.e., passage 200 is continuous about aft frame 190. In any event, spaced ribs 220 provide sufficient structural support to aft frame 190 such that the presence of passage 200, partially defined in inner end 192 of aft frame 190, does not create any structural weakness compared to conventional aft frames that do not include passage 200.

AM combustor body 160 also includes a first flow sleeve 230 integral with spaced ribs 220. That is, through the additive manufacture, first flow sleeve 230 shares metal layers with spaced ribs 220, and both are part of one-piece member 164 of AM combustor body 160. As shown in FIG. 3, first flow sleeve 230 extends circumferentially around transition portion 170 at a location forward of aft frame 190. First flow sleeve 230 also includes an aft end 232 axially spaced from aft frame 190. As shown in FIG. 5, a plurality of circumferentially spaced openings 234 are defined circumferentially between spaced ribs 220 aft of aft end 232 of first flow sleeve 230 and defined axially between aft end 232 of first flow sleeve 230 and intermediate portion 196 of aft frame 190. Plurality of circumferentially spaced openings 234 (hereafter "spaced openings 234") are in fluid communication with circumferentially extending passage 200 defined partially within inner end 192 of aft frame 190. Hence, compressed air 120 can flow from compressed air source 154 into spaced openings 234 and into circumferentially extending passage 200 to cool aft frame 190.

First flow sleeve 230 is spaced from exterior surface 222 of transition portion 170 by spaced ribs 220, such that first flow sleeve 230, spaced ribs 220, and transition portion 170 collectively define a plurality of cooling passages 240. More particularly, first flow sleeve 230, spaced ribs 220 and exterior surface 222 of combustion liner 166 at transition portion 170 define plurality of cooling passages 240 therebetween. Spaced ribs 220 stop extending forwardly at forward end 246 of first flow sleeve 230. That is, spaced ribs 220 extend along an entirety of the axial length of first flow sleeve 230. With this configuration, as noted, compressed air 120 from compressed air source 154 may enter spaced openings 234 and pass aft to enter passage 200 in aft frame 190 and circulate circumferentially (or partially circumferentially at numerous locations) to cool it. In addition, compressed air 120 from compressed air source 154 may pass forward through cooling passages 240 between spaced ribs 220, exterior surface 222 of combustion liner 166 (i.e., transition portion 170 thereof) and first flow sleeve 230. Compressed air 120 passing forward through cooling passages 240 serves to at least cool exterior surface 222 of combustion liner 166 (i.e., transition portion 170 thereof).

As shown in FIGS. 2 and 4, AM combustor body 160 may also optionally include a second flow sleeve 250 extending in a spaced manner around combustion liner 166 and coupled to forward end 246 of first flow sleeve 230. Spaced ribs 220 allow for a sliding interface (see FIG. 4) between flow sleeves 230, 250 and eliminate the need for stiffeners that are conventionally required to structurally support one or more flow sleeves about a combustion liner 166. Flow sleeves 230, 250 may be more permanently coupled using any known solution, e.g., welds or fasteners. Spaced ribs 220 stop at forward end 246 of first flow sleeve 230 such that second flow sleeve 250 defines an annular cooling passage 252 in fluid communication with plurality of cooling passages 240. Hence, compressed air 120 flowing in cooling passages 240 passes through annular cooling passage 252.

Second flow sleeve 250 may include a sleeve that is solid or that includes impingement openings (not shown). Second flow sleeve 250 is separate from AM combustor body 160 and may be made of, for example, a sheet metal. Compressed air 120 passing through cooling passages 240 enters annular cooling passage 252 within second flow sleeve 250 and compressed air 120 may be used to feed combustion in, for example, AFS injectors 186 (FIG. 2) or head end assembly 174 (FIG. 2). Second flow sleeve 250 may extend forwardly any desired extent to, for example, fluidly connect to AFS injector(s) 186 and/or head end assembly 174. As shown, for example, in FIG. 5, where second flow sleeve 250 is not provided, compressed air 120 may exit cooling passages 240 to compressed air source 154 for re-use.

As shown in FIGS. 4 and 5, in some embodiments, first flow sleeve 230 may diverge from exterior surface 222 of transition portion 170 from aft end 232 thereof to a forward end 246 thereof. More particularly, a distance D1 between aft end 232 of first flow sleeve 230 and exterior surface 222 of transition portion 170 at aft end 232 thereof is smaller than a distance D2 between first flow sleeve 230 and exterior surface 222 of transition portion 170 at forward end 246 thereof. In other embodiments, although not shown, first flow sleeve 230 may be parallel to exterior surface 222 of transition portion 170 from aft end 232 thereof to forward end 246 thereof.

Figure 7:
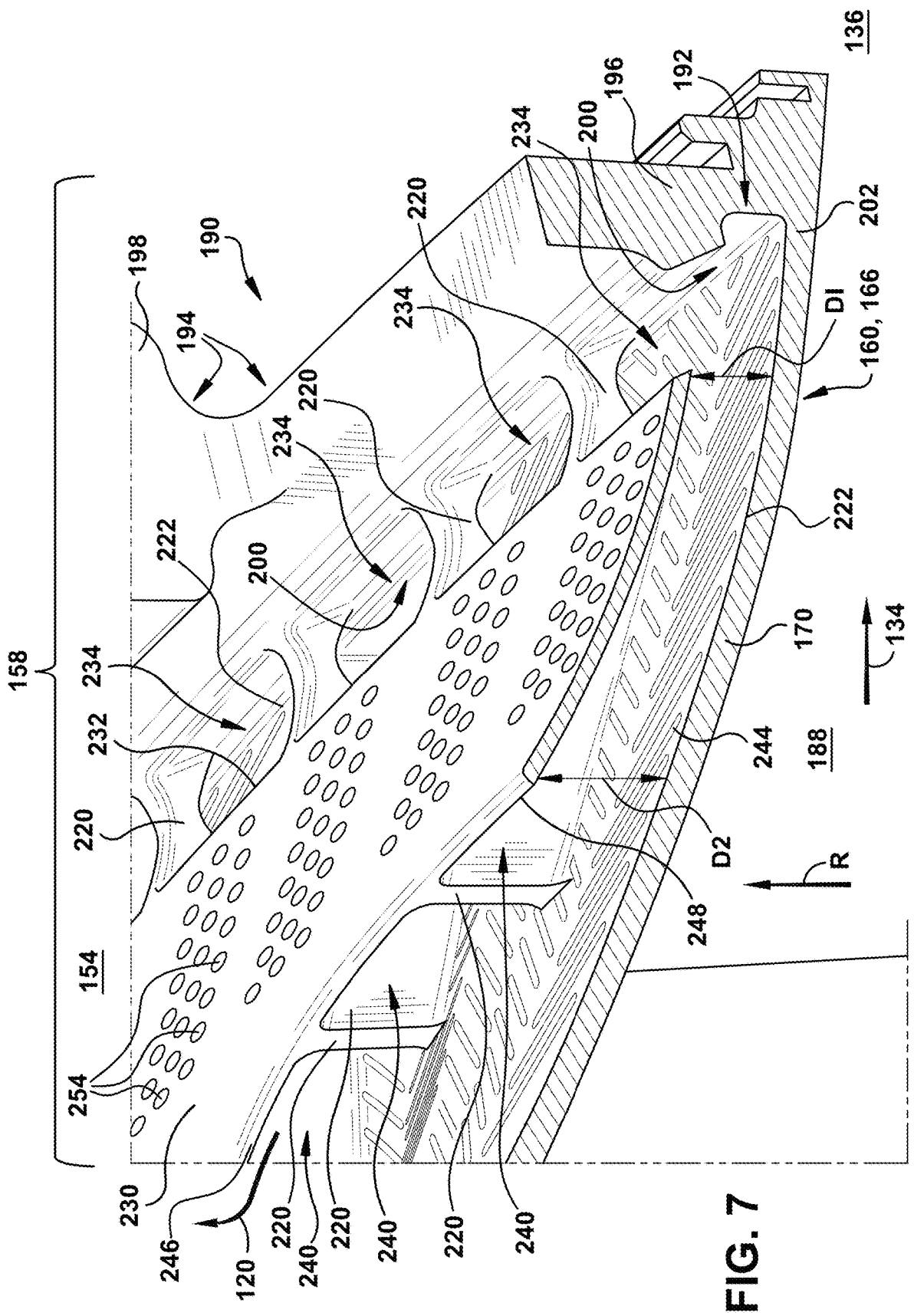
FIG. 7 shows an enlarged perspective view of an aft frame region of a combustor body (per the dashed box in FIG. 3) according to other embodiments of the disclosure.

As shown in FIG. 5, AM combustor body 160 may also optionally include a plurality of cooling enhancement structures 242 extending from exterior surface 222 of transition portion 170. Cooling enhancement structures 242 may include any form of protrusions configured to create non-laminar flow such as but not limited to ribs, bumps, chevrons and/or posts. FIG. 7 shows an enlarged perspective view of an aft frame region of a combustor body according to other embodiments of the disclosure. As shown in FIG. 7, AM combustor body 160 may also optionally include a plurality of cooling enhancement channels 244 extending into exterior surface 222 of transition portion 170. Cooling enhancement channels 244 may include any form of recess configured to create non-laminar flow such as but not limited to trenches and recessed openings (divots). The spacing and location of cooling enhancement structures 242 (FIG. 5) and/or channels 244 (FIG. 7) can take any form to provide the desired cooling, e.g., between spaced ribs 220, within passages 240. Although not shown, cooling enhancement structures 242 (FIG. 5) and/or channels 244 (FIG. 7) may also be located within passage 200, on spaced ribs 220 and/or within or extending from a radially inward facing surface 248 (FIG. 5) of first flow sleeve 230.

With continuing reference to FIG. 7, in other embodiments, first flow sleeve 230 may include a plurality of (impingement) openings 254 therethrough and in fluid communication with compressed air source 154. In this configuration, compressed air 120 from compressed air source 154 may: enter spaced openings 234 and pass aft to enter passage 200 in aft frame 190 and circulate circumferentially (or partially circumferentially at numerous locations) to cool it; enter spaced openings 234 and pass forward to enter cooling passages 240 between spaced ribs 220, exterior surface 222 of combustion liner 166 (i.e., transition portion 170 thereof) and first flow sleeve 230; and/or pass through openings 254 in first flow sleeve 230 to provide impingement cooling to exterior surface 222 of combustion liner 166 (i.e., transition portion 170 thereof). After passing through openings 254 and impinging on exterior surface 222, the post-impingement air (not separately labeled) may then pass aftward to passage 200 to cool exterior surface 222 of combustion liner 166 (i.e., transition portion 170 thereof) and/or pass forward along cooling passages 240 to, for example, feed combustion in, for example, AFS injectors 186 (FIG. 2) or head end assembly 174 (FIG. 2). In the latter case, flow sleeve(s) 230, 250 with transition portion 170 may route at least a portion of compressed air 120 from compressed air source 154 to AFS injector(s) 186 or head end assembly 174 to combine with fuel(s) 122 for combustion in combustion zone(s) 184, 188.

Figure 8:
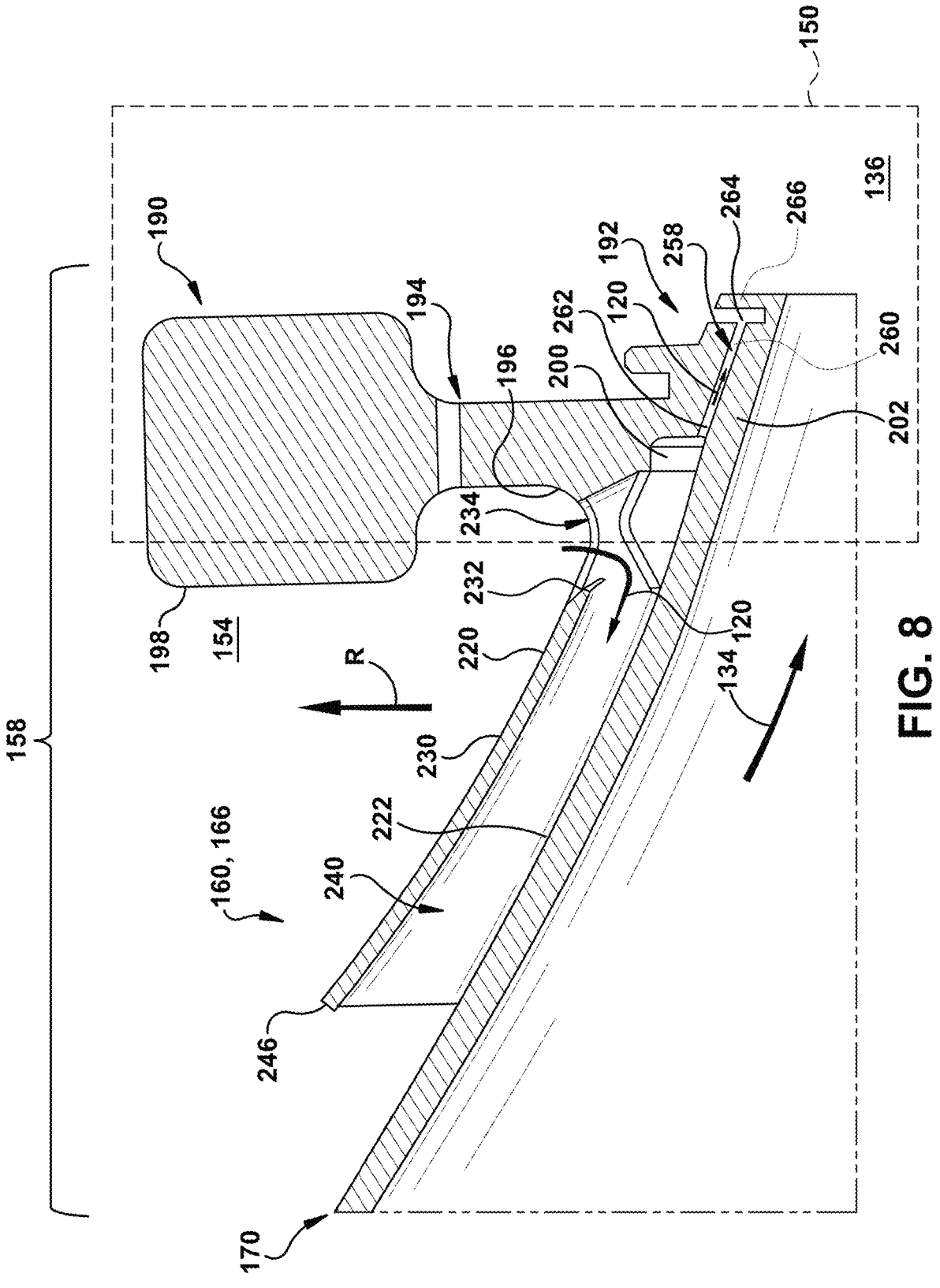
FIG. 8 shows an enlarged cross-sectional view of an aft frame region of a combustor body (per the dashed box in FIG. 3) according to other embodiments of the disclosure.
Figure 9:
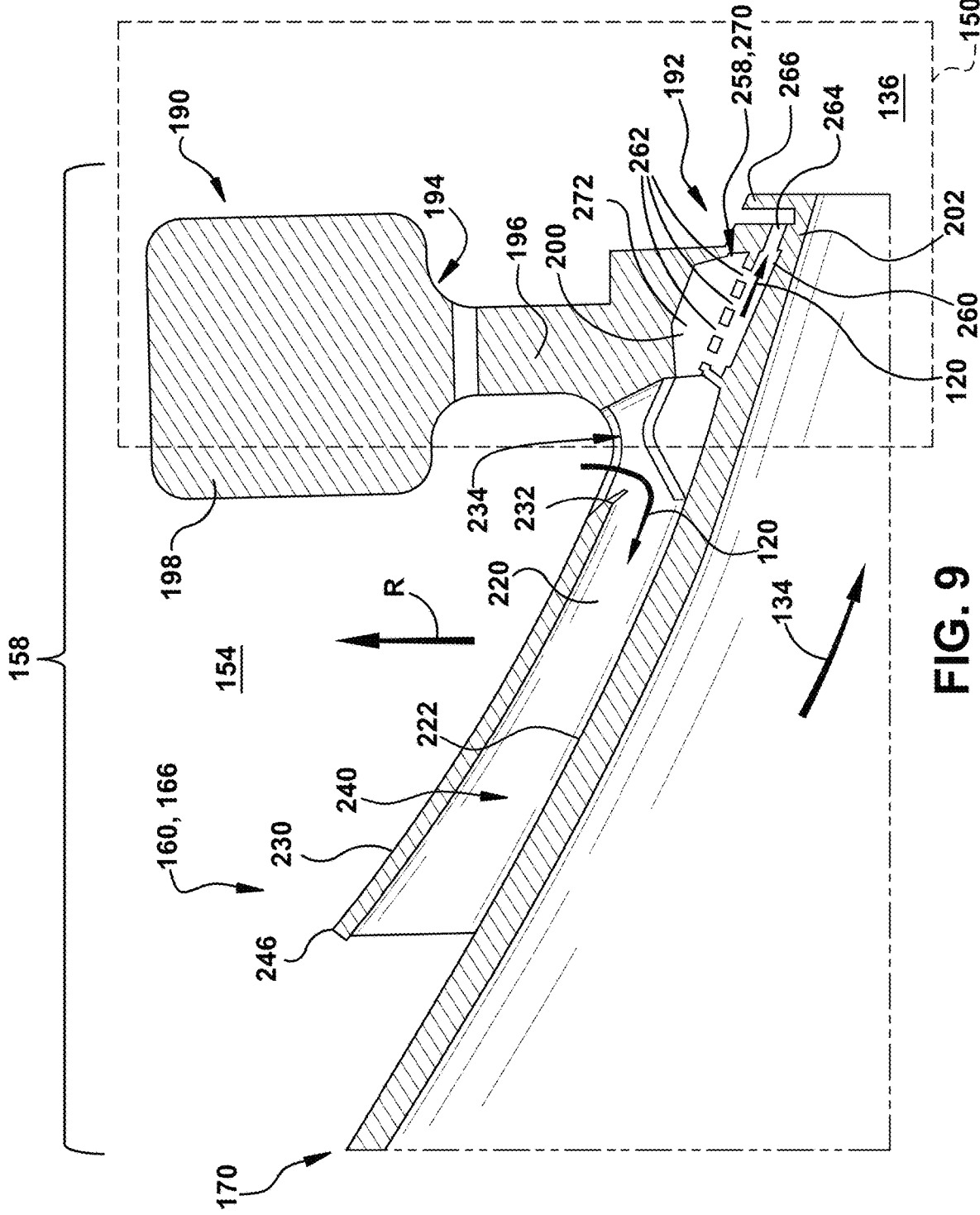
FIG. 9 shows an enlarged cross-sectional view of an aft frame region of a combustor body (per the dashed box in FIG. 3) according to additional embodiments of the disclosure.

FIGS. 8 and 9 show enlarged cross-sectional views of aft frame region 158 of AM combustor body 160 (per the dashed box in FIG. 3) according to other embodiments of the disclosure. In these embodiments, aft frame 190 includes forms of a cooling feature 258 defined within inner end 192 of aft frame 190. Cooling feature 258 has one or more inlets 262 in fluid communication with circumferentially extending passage 200 and one or more outlets 264 through a downstream end 266 of aft frame 190. In FIG. 8, cooling feature 258 includes a cooling passage 260 having inlet(s) 262 in fluid communication with passage 200 and outlet(s) 264 through downstream end 266 of aft frame 190. Any number of cooling passages 260 may be used. Each cooling passage 260 can have any number of inlets 262 and/or outlets 264 and can take any path through aft frame 190 desired to provide cooling. In FIG. 9, cooling feature(s) 258 includes an impingement cooling structure 270 defined within inner end 192 of aft frame 190. As illustrated, impingement cooling structure 270 is defined within an enlarged portion 272 of passage 200 in inner end 192 of aft frame 190. Inner end 192 of aft frame 190 may be enlarged in an aft direction to accommodate enlarged portion 272, but this may not be necessary in all cases. Impingement cooling structure 270 has a plurality of inlets 262 in fluid communication with passage 200 or enlarged portion 272 thereof and outlet(s) 264 through downstream end 266 of aft frame 190. Compressed air 120 from passage 200 passes through impingement cooling structure 270 to cool combustion liner 166 radially inward of aft frame 190 before passing through outlet(s) 264. Any number of impingement cooling structures 270 may be used, and any percentage of the length of passage 200 (up to 100%) may be provided with impingement cooling structure 270.

Returning to FIG. 2, combustor 130 generally terminates at a point that is adjacent to first stage 210 of stationary nozzles 212 of turbine 136. Combustion liner 166 at least partially defines a hot gas path (HGP) for routing combustion gases 134 from primary combustion zone 184 and secondary combustion zone 188 to turbine inlet casing 150 of turbine 136 during operation of GT system 100. In operation, compressed air 120 flows from compressor 116 and is routed through various fluid flow passage(s). A portion of compressed air 120 is routed to head end assembly 174 of combustor 130 through second flow sleeve 250 or other flow passage(s) where it reverses direction and is directed through axially extending fuel nozzle(s) 180. Compressed air 120 is mixed with fuel(s) 122 to form a first combustible mixture that is injected into primary combustion zone 184. The fuel may be the same fuel(s) 122 supplied from fuel source(s) 124 to AFS injectors 186, or it may be a different fuel or a different fuel source. The first combustible mixture is burned to produce combustion gases 134. A second portion of compressed air 120 may be routed through the radially extending AFS injector(s) 186 where it is mixed with fuel(s) 122 from fuel passages (e.g., conduits from fuel source(s) 124 provided as external tubes (shown) or in second flow sleeve(s) 250) to form a second combustible mixture. The second combustible mixture is injected through combustion liner 166 and into the hot gas path (HGP). The second combustible mixture at least partially mixes with combustion gases 134 and is burned in secondary combustion zone 188. Combustion liner 166 at least partially defines hot gas path (HGP) for routing combustion gases 134 from primary combustion zone 184 and secondary combustion zone 188 to turbine inlet casing 150 of turbine 136 during operation of GT system 100.

As GT system 100 operates, compressed air 120 also enters spaced openings 234 in aft frame region 158 to cool aft frame 190 through passage 200 (and perhaps cooling feature(s) 258), and cool transition portion 170 of combustion liner 166 of AM combustor body 160. Some of compressed air 120 forward of aft frame 190 may enter cooling passages 240 between first flow sleeve 230, exterior surface 222 of transition portion 170 and spaced ribs 220 and may be directed forwardly. Where a second flow sleeve 250 is provided, compressed air 120 in cooling passages 240 may be directed to AFS injector(s) 186 (FIG. 2) or head end assembly 174 (FIG. 2) where it is used for combustion with fuel(s) 122. Where second flow sleeve 250 is not provided, compressed air 120 in cooling passages 240 may be reused in compressed air source 154. Where first flow sleeve 230 and/or second flow sleeve 250 includes impingement openings (e.g., impingement openings 254 in FIG. 7), compressed air 120 from compressed air source 154 may provide impingement cooling of those portions of combustion liner 166 radially inward of the impingement openings. Where cooling features 260 are not provided in aft frame 190, compressed air 120 from aft frame 190 is re-used, which is more efficient than discarding it to first stage 210 of stationary nozzles 212. Otherwise, where cooling features 260 are provided in aft frame 190, at least some compressed air 120 may be discarded downstream of aft frame 190.

Embodiments of the disclosure may also include, as shown in FIGS. 1-2, GT system 100 including compressor section 118, combustion section 132 operatively coupled to compressor section 118, and turbine section 138 operatively coupled to combustion section 132. Combustion section 132 includes at least one combustor 130 including AM combustor body 160 including one-piece member 164, as described herein.

Figures 10, 11:
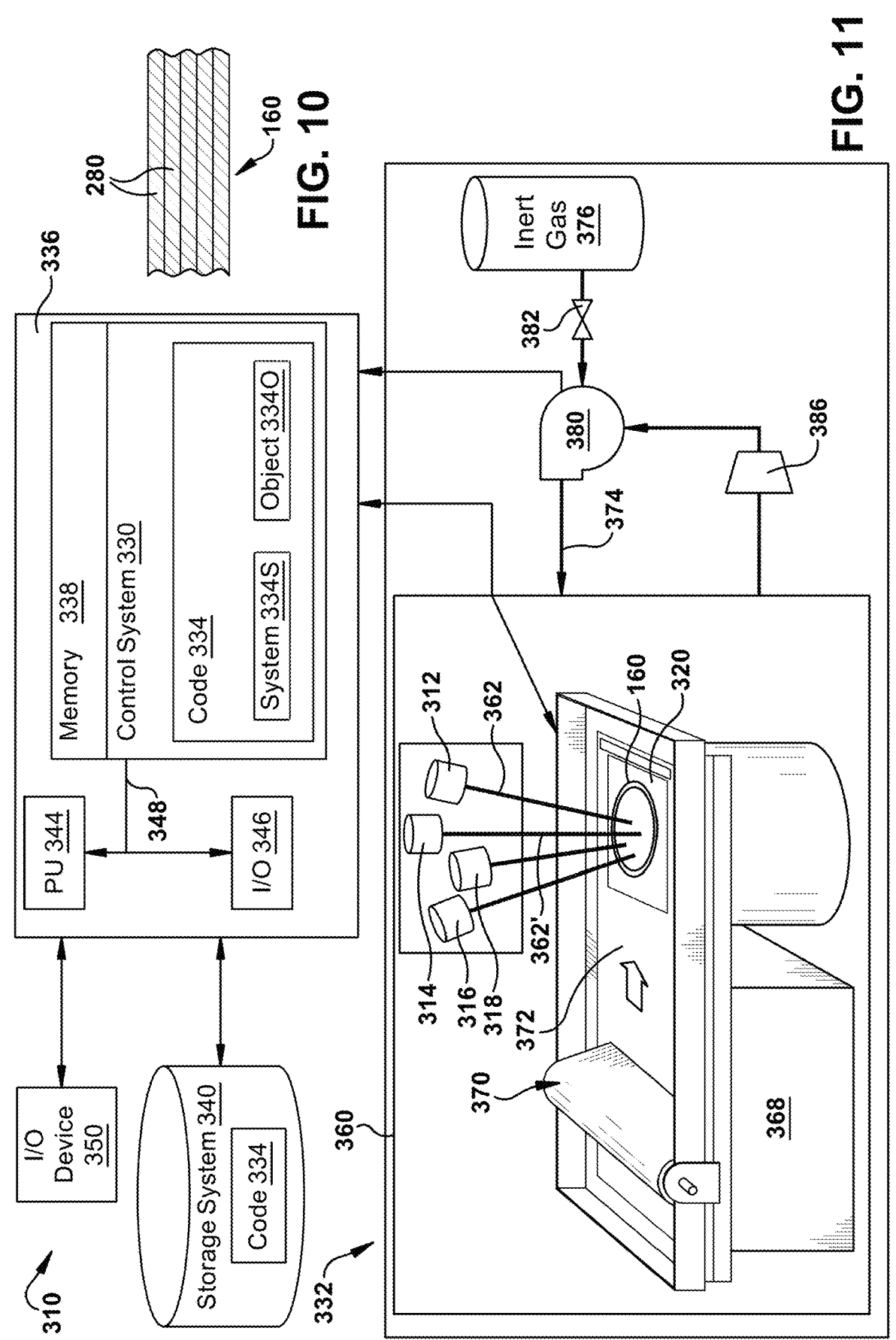
FIG. 10 shows a cross-sectional view of a plurality of parallel, sintered metal layers of a combustor body according to embodiments of the disclosure.
FIG. 11 shows a schematic block diagram of an illustrative additive manufacturing system for additively manufacturing a combustor body according to embodiments of the disclosure.

As noted, AM combustor body 160 may be additively manufactured using any now known or later developed technique capable of forming the large, integral body. As a result of the additive manufacturing, there are no mechanical connections between the various parts in AM combustor body 160 (i.e., it is all one-piece). FIG. 10 shows a cross-sectional view of any portion of additively manufactured combustor body 160. As shown in FIG. 10, AM combustor body 160 includes a plurality of parallel, sintered metal layers 280, i.e., from the additive manufacturing thereof.

FIG. 11 shows a schematic/block view of an illustrative computerized metal powder additive manufacturing system 310 (hereinafter 'AM system 310') for generating AM combustor body 160, of which only a single layer is shown. The teachings of the disclosures will be described relative to building AM combustor body 160 using multiple melting beam sources 312, 314, 316, 318, but it is emphasized and will be readily recognized that the teachings of the disclosure are equally applicable to build AM combustor body 160 using any number of melting beam sources. In this example, AM system 310 is arranged for direct metal laser melting (DMLM). It is understood that the general teachings of the disclosure are equally applicable to other forms of metal powder additive manufacturing such as but not limited to selective laser melting (SLM), and perhaps other forms of additive manufacturing (i.e., other than metal powder applications). The layer of AM combustor body 160 in build platform 320 is illustrated as a circular element in FIG. 11; however, it is understood that the additive manufacturing process can be readily adapted to manufacture any shape on build platform 320.

AM system 310 generally includes an additive manufacturing control system 330 ("control system") and an AM printer 332. As will be described, control system 330 executes set of computer-executable instructions or code 334 to generate AM combustor body 160 using multiple melting beam sources 312, 314, 316, 318. In the example shown, four melting beam sources may include four lasers. However, the teachings of the disclosures are applicable to any melting beam source, e.g., an electron beam, laser, etc. Control system 330 is shown implemented on computer 336 as computer program code. To this extent, computer 336 is shown including a memory 338 and/or storage system 340, a processor unit (PU) 344, an input/output (I/O) interface 346, and a bus 348. Further, computer 336 is shown in communication with an external I/O device/resource 350. In general, processor unit (PU) 344 executes computer program code 334 that is stored in memory 338 and/or storage system 340. While executing computer program code 334, processor unit (PU) 344 can read and/or write data to/from memory 338, storage system 340, I/O device 350 and/or AM printer 332. Bus 348 provides a communication link between each of the components in computer 336, and I/O device 350 can comprise any device that enables a user to interact with computer 336 (e.g., keyboard, pointing device, display, etc.).

Computer 336 is only representative of various possible combinations of hardware and software. For example, processor unit (PU) 344 may comprise a single processing unit or be distributed across one or more processing units in one or more locations, e.g., on a client and server. Similarly, memory 338 and/or storage system 340 may reside at one or more physical locations. Memory 338 and/or storage system 340 can comprise any combination of various types of non-transitory computer readable storage medium including magnetic media, optical media, random access memory (RAM), read only memory (ROM), etc. Computer 336 can comprise any type of computing device such as an industrial controller, a network server, a desktop computer, a laptop, a handheld device, etc.

As noted, AM system 310, and in particular, control system 330, executes code 334 to generate AM combustor body 160. Code 334 can include, among other things, a set of computer-executable instructions 334S (herein also referred to as 'code 334S') for operating a system (i.e., AM printer 332) and a set of computer-executable instructions 3340 (herein also referred to as 'code 3340') for defining an object (i.e., AM combustor body 160) to be physically generated by AM printer 332. As described herein, additive manufacturing processes begin with a non-transitory computer readable storage medium (e.g., memory 338, storage system 340, etc.) storing code 334. Set of computer-executable instructions 334S for operating AM printer 332 may include any now known or later developed software code capable of operating AM printer 332.

The set of computer-executable instructions 3340 defining AM combustor body 160 may include a precisely defined 3D model of AM combustor body 160 and can be generated from any of a large variety of well-known computer aided design (CAD) software systems such as Auto-CAD®, TurboCAD®, DesignCAD 3D Max, etc. In this regard, code 3340 can include any now known or later developed file format. Furthermore, code 3340 representative of the part to be built, e.g., AM combustor body 160, may be translated between different formats. For example, code 3340 may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 3340 representative of AM combustor body 160 may also be converted into a set of data signals and transmitted, received as a set of data signals and converted to code, stored, etc., as necessary. Code 3340 may be configured according to embodiments of the disclosure to allow for formation of border and internal sections in overlapping field regions, as will be described. In any event, code 3340 may be an input to AM system 310 and may come from a part designer, an intellectual property (IP) provider, a design company, the operator or owner of AM system 310, or from other sources. In any event, control system 330 executes code 334S and 3340, dividing AM combustor body 160 into a series of thin slices that assembles using AM printer 332 in successive layers of material.

AM printer 332 may include a processing chamber 360 that is sealed to provide a controlled atmosphere for AM combustor body 160 printing. A build platform 320, upon which AM combustor body 160 is/are built, is positioned within processing chamber 360. A number of melting beam sources 312, 314, 316, 318 are configured to melt layers of metal powder on build platform 320 to generate AM combustor body 160. While four melting beam sources 312, 314, 316, 318 are illustrated, it is emphasized that the teachings of the disclosure are applicable to a system employing any number of sources, e.g., 1, 2, 3, or 5 or more. As understood in the field, each melting beam source 312, 314, 316, 318 may have a field including a non-overlapping field region, respectively, in which it can exclusively melt metal powder, and may include at least one overlapping field region in which two or more sources can melt metal powder. In this regard, each melting beam source 312, 314, 316, 318 may generate a melting beam, respectively, that fuses particles for each slice, as defined by code 3340. For example, in FIG. 11, melting beam source 312 is shown creating a layer of AM combustor body 160 using melting beam 362 in one region, while melting beam source 314 is shown creating a layer of AM combustor body 160 using melting beam 362' in another region. Each melting beam source 312, 314, 316, 318 is calibrated in any now known or later developed manner. That is, each melting beam source 312, 314, 316, 318 has had its laser or electron beam's anticipated position relative to build platform 320 correlated with its actual position in order to provide an individual position correction (not shown) to ensure its individual accuracy. In one embodiment, each of plurality melting beam sources 312, 314, 316, 318 may create melting beams, e.g., 362, 362', having the same cross-sectional dimensions (e.g., shape and size in operation), power and scan speed.

Continuing with FIG. 11, an applicator (or re-coater blade) 370 may create a thin layer of raw material 372 spread out as the blank canvas from which each successive slice of the final AM combustor body 160 will be created. Various parts of AM printer 332 may move to accommodate the addition of each new layer, e.g., a build platform 320 may lower and/or chamber 360 and/or applicator 370 may rise after each layer. The process may use different raw materials in the form of fine-grain metal powder, a stock of which may be held in a chamber 368 accessible by applicator 370.

Processing chamber 360 is filled with an inert gas such as argon or nitrogen and controlled to reduce or eliminate oxygen. Control system 330 is configured to control a flow of a gas mixture 374 within processing chamber 360 from a source of inert gas 376. In this case, control system 330 may control a pump 380, and/or a flow valve system 382 for inert gas to control the content of gas mixture 374. Flow valve system 382 may include one or more computer controllable valves, flow sensors, temperature sensors, pressure sensors, etc., capable of precisely controlling flow of the particular gas. Pump 380 may be provided with or without valve system 382. Where pump 380 is omitted, inert gas may simply enter a conduit or manifold prior to introduction to processing chamber 360. Source of inert gas 376 may take the form of any conventional source for the material contained therein, e.g., a tank, reservoir or other source. Any sensors (not shown) required to measure gas mixture 374 may be provided. Gas mixture 374 may be filtered using a filter 386 in a conventional manner.

In operation, build platform 320 with metal powder thereon is provided within processing chamber 360, and control system 330 controls flow of gas mixture 374 within processing chamber 360 from source of inert gas 376. Control system 330 also controls AM printer 332, and in particular, applicator 370 and melting beam sources 312, 314, 316, 318 to sequentially melt layers of metal powder on build platform 320 to generate the desired part according to embodiments of the disclosure. While a particular AM system 310 has been described herein, it is emphasized that the teachings of the disclosure are not limited to any particular additive manufacturing system or method.

The disclosure provides various technical and commercial advantages, examples of which are discussed herein. The AM combustor body having the circumferentially extending passage partially in the inner end of the aft frame, the spaced ribs and the first flow sleeve promotes increased convection and conduction cooling to the aft frame without loss of structural strength. The spaced ribs also allow a sliding interface with a second flow or impingement sleeve without the need for stiffeners for that second flow sleeve or impingement sleeve. In one or more embodiments, cooling enhancement features and/or channels in the exterior surface of the transition portion of the combustion liner can enhance the cooling of the transition portion. In one or more embodiments, cooling channels and/or impingement cooling structure may also be included in the aft frame to promote cooling thereof.

Approximating language, as used herein throughout the specification and claims, may be applied to modify any quantitative representation that could permissibly vary without resulting in a change in the basic function to which it is related. Accordingly, a value modified by a term or terms, such as "about," "approximately," "generally" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. A combustor for a gas turbine system, the combustor comprising:
   an additively manufactured (AM) combustor body including a one-piece member including:
   a combustion liner including a transition portion;
   an aft frame at an aft end of the transition portion, the aft frame including an inner end integral with the combustion liner, an outer end configured to couple to a turbine inlet casing, and a circumferentially extending passage defined partially within the inner end;
   a plurality of circumferentially spaced ribs extending forward from the inner end of the aft frame on an exterior surface of the transition portion of the combustion liner; and
   a first flow sleeve integral with the plurality of circumferentially spaced ribs, wherein the first flow sleeve extends circumferentially around the transition portion at a location forward of the aft frame and includes an aft end axially spaced from the aft frame,
   wherein the aft frame includes an intermediate portion between the inner end and the outer end thereof, and further comprising a plurality of circumferentially spaced openings defined circumferentially between the plurality of circumferentially spaced ribs aft of the aft end of the first flow sleeve and defined axially between the intermediate portion and the aft end of the first flow sleeve, wherein the plurality of circumferentially spaced openings are in fluid communication with the circumferentially extending passage defined partially within the inner end of the aft frame, and
   wherein the AM combustor body further includes a plurality of parallel, sintered metal layers.

2. The combustor of claim 1, further comprising a plurality of cooling enhancement structures extending from an exterior surface of the transition portion.

3. The combustor of claim 1, further comprising a plurality of cooling enhancement channels defined in an exterior surface of the transition portion.

4. The combustor of claim 1, wherein the first flow sleeve is spaced from an exterior surface of the transition portion; and wherein the first flow sleeve, the plurality of circumferentially spaced ribs and the transition portion collectively define a plurality of cooling passages.

5. The combustor of claim 4, further comprising a second flow sleeve extending in a spaced manner around the combustion liner and coupled to a forward end of the first flow sleeve, the second flow sleeve defining an annular cooling passage in fluid communication with the plurality of cooling passages.

6. The combustor of claim 1, wherein the first flow sleeve diverges from an exterior surface of the transition portion from an aft end thereof to a forward end thereof.

7. The combustor of claim 1, wherein the first flow sleeve includes a plurality of impingement openings therethrough and in fluid communication with a compressed air source.

8. The combustor of claim 1, further comprising a cooling passage defined within the inner end of the aft frame, the cooling passage having an inlet in fluid communication with the circumferentially extending passage and an outlet through a downstream end of the aft frame.

9. The combustor of claim 1, further comprising an impingement cooling structure defined within an enlarged portion of the circumferentially extending passage in the inner end of the aft frame, the impingement cooling structure having a plurality of inlets in fluid communication with the circumferentially extending passage and an outlet through a downstream end of the aft frame.

10. A gas turbine (GT) system, comprising:
a compressor section;
a combustion section operatively coupled to the compressor section; and
a turbine section operatively coupled to the combustion section,
wherein the combustion section includes at least one combustor including:
an additively manufactured (AM) combustor body including a one-piece member including:
a combustion liner including a transition portion;
an aft frame at an aft end of the transition portion, the aft frame including an inner end integral with the combustion liner, an outer end configured to couple to a turbine inlet, and a circumferentially extending passage defined within the inner end;
a plurality of circumferentially spaced ribs extending forward from the inner end of the aft frame on an exterior surface of the transition portion of the combustion liner; and
a first flow sleeve integral with the plurality of circumferentially spaced ribs, wherein the first flow sleeve extends circumferentially around the transition portion at a location forward of the aft frame and includes an aft end axially spaced from the aft frame, wherein the aft frame includes an intermediate portion between the inner end and the outer end thereof, and further comprising a plurality of circumferentially spaced openings defined circumferentially between the plurality of circumferentially spaced ribs aft of the aft end of the first flow sleeve and defined axially between the intermediate portion and the aft end of the first flow sleeve, wherein the plurality of circumferentially spaced openings are in fluid communication with the circumferentially extending passage in the inner end of the aft frame, and
wherein the AM combustor body further includes a plurality of parallel, sintered metal layers.

11. The GT system of claim 10, further comprising a plurality of cooling enhancement structures extending from an exterior surface of the transition portion.

12. The GT system of claim 10, further comprising a plurality of cooling enhancement channels defined in an exterior surface of the transition portion.

13. The GT system of claim 10, wherein the first flow sleeve is spaced from an exterior surface of the transition portion; and wherein the first flow sleeve, the plurality of circumferentially spaced ribs and the transition portion collectively define the plurality of cooling passages.

14. The GT system of claim 10, wherein the first flow sleeve diverges from an exterior surface of the transition portion from an aft end thereof to a forward end thereof.

15. The GT system of claim 10, further comprising a cooling passage defined within the inner end of the aft frame, the cooling passage having an inlet in fluid communication with the circumferentially extending passage and an outlet through a downstream end of the aft frame.

16. The GT system of claim 10, further comprising an impingement cooling structure defined within an enlarged portion of the circumferentially extending passage in the inner end of the aft frame, the impingement cooling structure having a plurality of inlets in fluid communication with the circumferentially extending passage and an outlet through a downstream end of the aft frame.

* * * * *